United States Patent
Hotogi et al.

(10) Patent No.: US 10,082,666 B2
(45) Date of Patent: Sep. 25, 2018

(54) SCANNING DEVICE AND IMAGE FORMING APPARATUS

(71) Applicant: CANON KABUSHIKI KAISHA, Tokyo (JP)

(72) Inventors: Tatsuya Hotogi, Susono (JP); Atsunobu Mori, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/611,608

(22) Filed: Jun. 1, 2017

(65) Prior Publication Data

US 2017/0363862 A1 Dec. 21, 2017

(30) Foreign Application Priority Data

Jun. 17, 2016 (JP) .................. 2016-120924

(51) Int. Cl.
*G02B 26/12* (2006.01)
*B41J 2/44* (2006.01)
*B41J 2/47* (2006.01)

(52) U.S. Cl.
CPC ............ *G02B 26/127* (2013.01); *B41J 2/442* (2013.01); *G02B 26/125* (2013.01); *B41J 2/473* (2013.01); *G02B 26/123* (2013.01)

(58) Field of Classification Search
CPC .. G02B 26/127; G02B 26/125; G02B 26/123; B41J 2/442; B41J 2/473; B41J 11/42; B41J 11/51; G03G 2215/00599
See application file for complete search history.

(56) References Cited

U.S. PATENT DOCUMENTS

| | | | |
|---|---|---|---|
| 5,864,355 A | 1/1999 | Bush et al. | |
| 2006/0243886 A1* | 11/2006 | Nomura | G02B 26/105 250/208.1 |
| 2007/0242332 A1* | 10/2007 | Fujimori | G02B 26/127 359/204.1 |
| 2013/0278703 A1* | 10/2013 | Hirano | G03G 15/55 347/224 |
| 2015/0286160 A1* | 10/2015 | Akagi | G03G 15/043 347/118 |

* cited by examiner

*Primary Examiner* — Kristal Feggins
(74) *Attorney, Agent, or Firm* — Canon U.S.A., Inc. IP Division

(57) ABSTRACT

A CPU is provided which controls a first light emission state in which a light source is controlled to emit a light beam to scan a full-scanning region and a second light emission state in which the light source is controlled to emit a light beam to scan a non-image region in a period from start of activation of a scanning motor to when the number of rotations of the scanning motor reaches a target number of rotations. The CPU acquires BD cycle values of BD signals generated by a main-scanning synchronization sensor, determines a second timing for changing from the first light emission state to the second light emission state on the basis of the two serial BD cycle values, and changes the semiconductor laser from the first light emission state to the second light emission state according to the second timing.

17 Claims, 14 Drawing Sheets

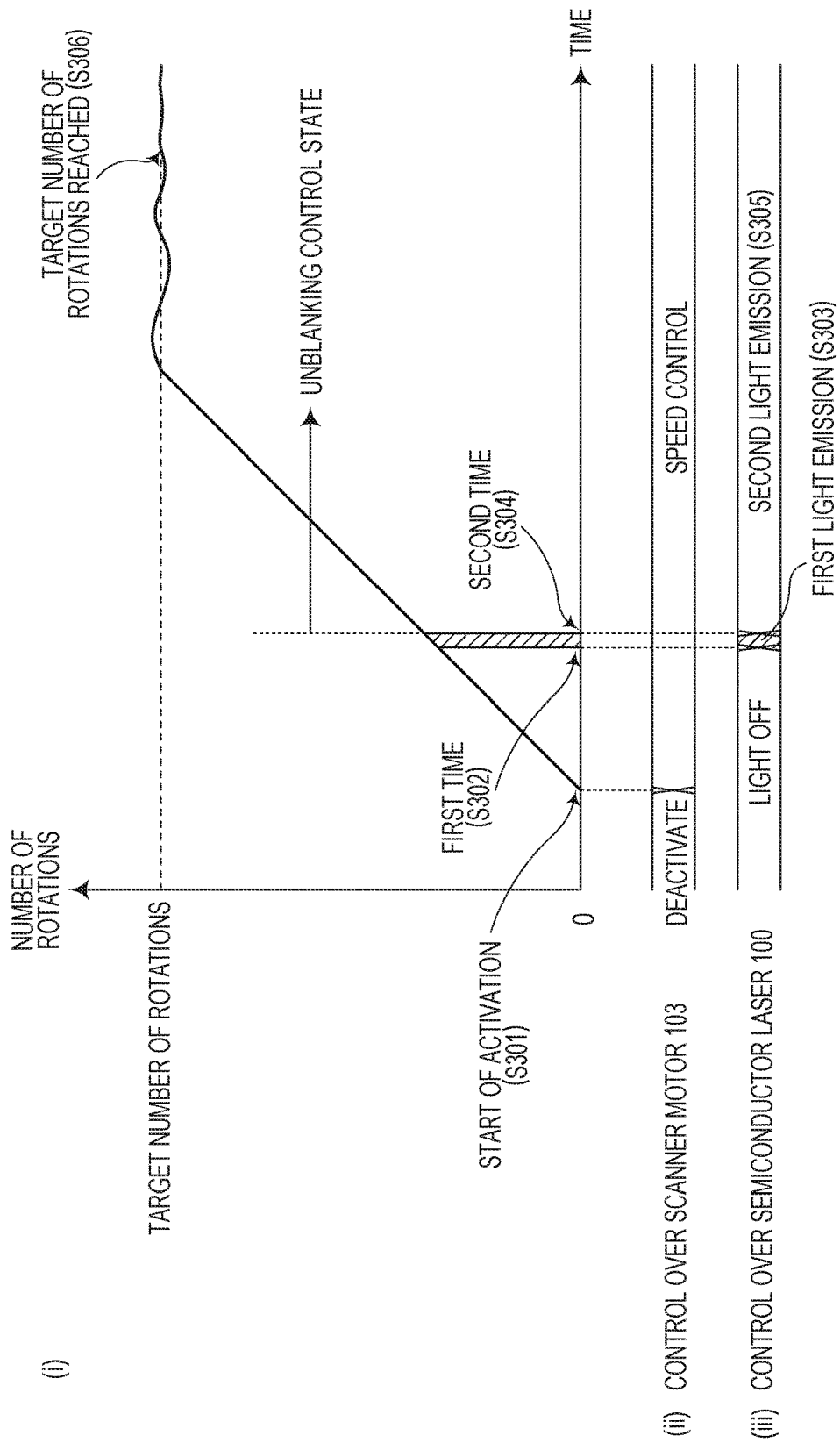

SCANNING DEVICE AND IMAGE FORMING APPARATUS

BACKGROUND

Field of Art

The present disclosure relates to a scanning device and an image forming apparatus and, in particular, relates to activation control over a scanning device for use in an image forming apparatus such as an electrophotographic printer which involves exposure to laser light.

Description of the Related Art

Conventionally, unblanking control has been proposed (see U.S. Pat. No. 5,864,355, for example) which limits a light emission region for laser light to a non-image region of an entire scan region to be scanned by a scanning device in activating the scanning device which forms a latent image by applying laser light to a photosensitive member.

In recent years, the activation time periods of scanning devices tend to decrease. Therefore, there is a need for proposal of a technology which can, in activating such a scanning device, avoid application of laser light more than necessary to a photosensitive member and stabilize a laser element to a predetermined light quantity before image forming starts.

SUMMARY

In view of such a need, the present embodiments can, in activating a scanning device, avoid application of laser light more than necessary to a photosensitive member and stabilize a laser element to a predetermined light quantity before image forming starts.

A present embodiment has the following configuration.

According to a first aspect of an embodiment, there is provided a scanning device including a light source configured to emit a light beam, a deflecting unit configured to deflect and scan the light beam emitted from the light source, a driving unit configured to drive the deflecting unit to scan the light beam in a full-scanning region, a generating unit disposed in a second region of the full-scanning region, wherein the second region is excluding a first region an which the light beam based on image data is scanned, and the generating unit is configured to generate a signal in response to reception of the light beam, and a control unit configured to control a first light emission state and a second light emission state in an activation period from start of activation of the driving unit to when the number of rotations of the driving unit reaches a target number of rotations, the control unit controlling the light source to emit light such that the light beam scans the first region and the second region in the first light emission state and controlling the light source to emit light such that the light beam scans the second region, wherein the control unit acquires cycles of the signals generated by the generating unit, determines a timing for changing from the first light emission state to the second light emission state on the basis of the cycles of two serial signals, and changes the light source from the first light emission state to the second light emission state according to the timing.

According to a second aspect of an embodiment, there is provided an image forming apparatus including a photosensitive member having an electrostatic latent image to be formed thereon, a scanning device configured to form the electrostatic latent image on the photosensitive member, wherein the scanning device includes a light source configured to emit a light beam, a deflecting unit configured to deflect and scan the light beam emitted from the light source, a driving unit configured to drive the deflecting unit to scan the light beam in a full-scanning region, a generating unit disposed in a second region of the full-scanning region, wherein the second region is excluding a first region on which the light beam based on image data is scanned, and the generating unit is configured to generate a signal in response to reception of the light beam, and a control unit configured to control a first light emission state and a second light emission state in an activation period from start of activation of the driving unit to when the number of rotations of the driving unit reaches a target number of rotations, the control unit controlling the light source to emit light such that the light beam scans the first region and the second region in the first light emission state and controlling the light source to emit light such that the light beam scans the second region, wherein the control unit acquires cycles of the signals generated by the generating unit, determines a timing for changing from the first light emission state to the second light emission state on the basis of the cycles of two serial signals, and changes the light source from the first light emission state to the second light emission state according to the timing, a developing unit configured to develop the electrostatic latent image formed on the photosensitive member by using toner to form a toner image, and a transfer unit configured to transfer the toner image formed by the developing unit on the photosensitive member to a recording material.

Features of the present invention will become apparent from the following description of exemplary embodiments with reference to the attached drawings.

BRIEF DESCRIPTION OF THE DRAWINGS

FIG. 2B illustrates changes in the number of rotations of a scanning motor.

DESCRIPTION OF THE EMBODIMENTS

With reference to drawings, modes for embodying the present invention will be illustrated in detail based on embodiments. However, it should be understood that dimensions, quality, shapes and relative arrangement of components according to embodiments may be changed in accordance with the configuration and conditions of an apparatus to which the invention is applied. In other words, it is not intended that the scope of the present invention is limited to the following embodiments.

First Embodiment

Configuration of Image Forming Apparatus

Figure 1A:
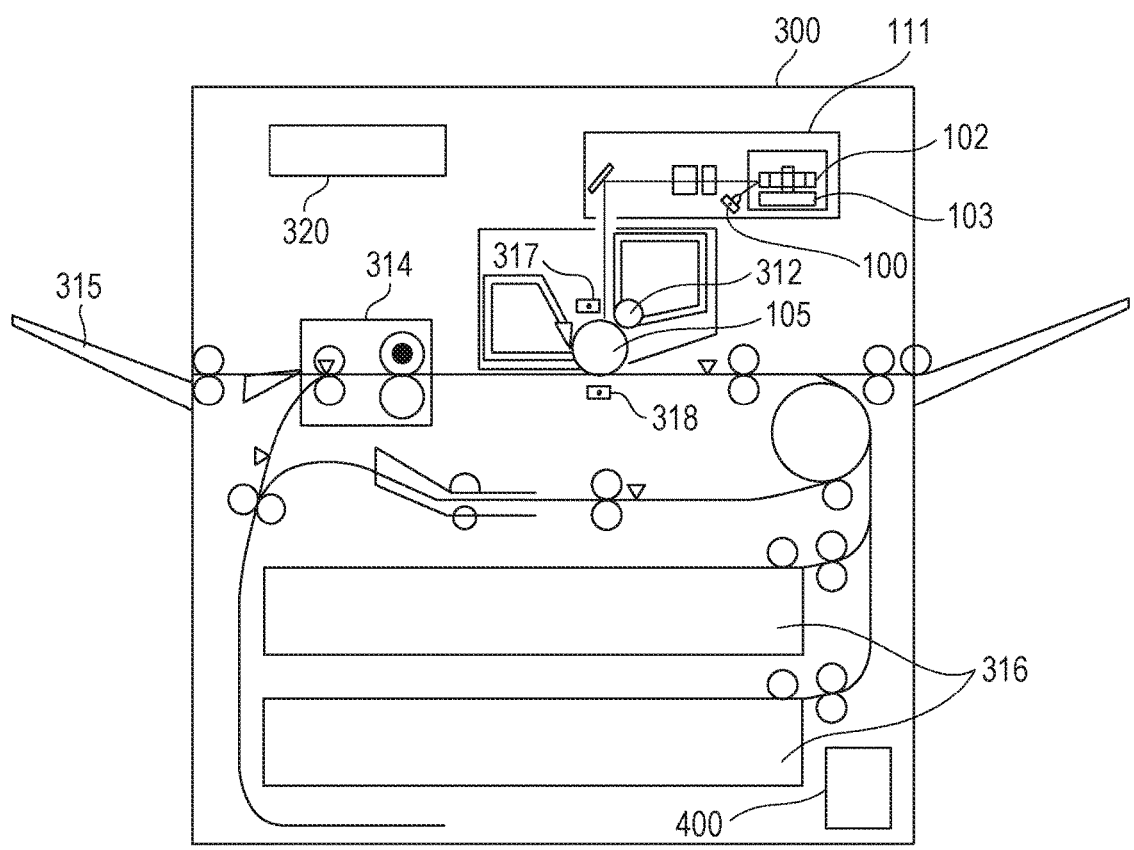
FIG. 1A illustrates an image forming apparatus according to first to fourth embodiments.

A laser beam printer will be described as an example of an image forming apparatus which is common in embodiments. FIG. 1A illustrates a schematic configuration of a laser beam printer that is an example of an electrophotographic printer. The laser beam printer (hereinafter, called a printer) 300 includes a photoconductive drum 105 functioning as a photosensitive member having an electrostatic latent image to be formed thereon and a charging unit 317 (charging device) configured to uniformly charge the photoconductive drum 105. The printer 300 further includes a scanning device 111 configured to form an electrostatic latent image on the photoconductive drum 105. The scanning device 111 has a rotatable polygonal mirror 102, a scanning motor 103 configured to drive the rotatable polygonal mirror 102, and a semiconductor laser 100 configured to emit laser light to be applied for forming an electrostatic latent image on the photoconductive drum 105. These components will be described below. The printer 300 further includes developing unit 312 (developing device) configured to develop an electrostatic latent image formed on the photoconductive drum 105 by using toner. A toner image developed on the photoconductive drum 105 is transferred to a transfer unit 318 (transfer device) on a sheet (not illustrated) being a recording material supplied from a cassette 316, and the toner image transferred to the sheet is fixed by a fuser 314 and is discharged to a tray 315. The photoconductive drum 105, the charging unit 317, the developing unit 312, and the transfer unit 318 construct an image forming portion. The printer 300 further includes a power supply device 400. It should be noted that the image forming apparatus is not limited to the one illustrated in FIG. 1A but may be an image forming apparatus including a plurality of image forming portions, for example. The image forming apparatus may include a primary transfer unit configured to transfer a toner image on the photoconductive drum 105 to an intermediate transfer belt and a secondary transfer unit configured to transfer the toner image on the intermediate transfer belt to a sheet.

The printer 300 further includes a controller 320 configured to control image forming operations in the image forming portion, sheet conveyance operations, driving of the scanning motor 103 in the scanning device 111 and the light quantity of the semiconductor laser 100. The power supply device 400 is configured to supply power to the controller 320, for example. The power supply device 400 is configured to supply power to a motor for rotating the photoconductive drum 105 and driving rollers for conveying a sheet and to a driving unit for the scanning motor 103 in the scanning device 111.

Scanning Device

Figure 1B:
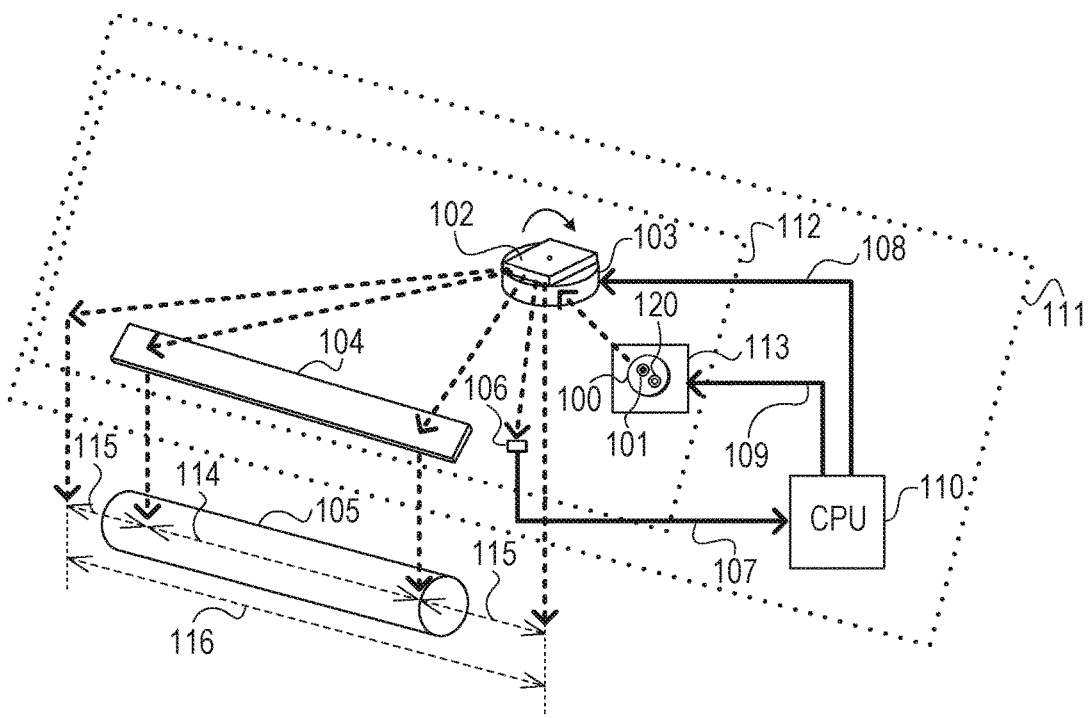
FIG. 1B illustrates a schematic configuration of a scanning device.

Next, the scanning device 111 according to the first embodiment will be described. FIG. 1B is a perspective view illustrating schematic configurations of the scanning device 111 being an exposure device that is common in embodiments and the laser scanner unit 112 being a principal part of the scanning device 111. The semiconductor laser 100 is a light source for forming a latent image on a surface of the photoconductive drum 105, that is, a light source for image exposure. The semiconductor laser 100 includes one laser diode 101 being a light emitting device and one photodiode 120 being a light receiving element and is controlled by the laser driving circuit 113. Control operations over the semiconductor laser 100 to be performed by the laser driving circuit 113 will be described in detail below. The scanning motor 103 being a driving unit is an example of a rotation driving unit for rotating the rotatable polygonal mirror 102 and is configured to rotate the rotatable polygonal mirror 102 in a rotational direction as illustrated in FIG. 1B.

Laser light (light beam) emitted from the semiconductor laser 100 is deflected by a rotating operation of the rotatable polygonal mirror 102 being a deflecting unit, and the deflected laser light is scanned periodically within a predetermined range. The rotatable polygonal mirror 102 is an example of a deflecting unit. The deflecting unit is a reflective component that deflects laser light within a set range. The deflecting unit may deflect the light in a periodic manner. A predetermined range of laser light to be scanned by a rotating operation of the rotatable polygonal mirror 102 will be called a full-scanning region 116. Of the full-scanning region 116 where laser light is scanned by the rotatable polygonal mirror 102, a region to be scanned by laser light based on image data will be called an image region 114 which is a first region. An electrostatic latent image is formed on a region on the photoconductive drum 105 corresponding to the image region 114. Of the full-scanning region 116 where laser light is scanned by the rotatable polygonal mirror 102, a region excluding the first region will be called a non-image region 115 which is a second region. The full-scanning region 116 is divided into the image region 114 and the non-image region 115. The image region 114 is a region to be applied to a surface of the photoconductive drum 105 being an image bearing member through a reflection mirror 104 of laser light reflected by the rotatable polygonal mirror 102. On the other hand, the non-image region 115 refers to a region excluding the image region 114 of the full-scanning region 116.

The main-scanning synchronization sensor 106 being a generating unit is an example of a signal generating unit provided in a predetermined region within the non-image region 115 and is configured to generate a main-scanning synchronization signal 107 in response to reception of laser light when laser light is applied to a position having main-scanning synchronization sensor 106. The main-scanning synchronization signal 107 generated by the main-scanning synchronization sensor 106 will be called a BD (Beam Detect) signal 107, and a cycle of occurrence of the BD signal 107 will be called a BD cycle. The BD signal 107 is used as a scanning start reference signal in a main scanning direction and is used as a writing start position in the main scanning direction. The main scanning direction is a direction in which laser light is scanned by rotation of the rotatable polygonal mirror 102. A CPU 110 being a control unit has a function of sequentially storing a BD cycle every time the BD signal 107 is generated and controls the scanning motor 103 and the semiconductor laser 100 based on the value of the stored current BD cycle. In other words, the CPU 110 outputs a scanning motor drive signal 108 to the scanning motor 103. The CPU 110 accelerates the scanning motor 103 if the number of rotations corresponding to the current BD cycle is lower than a set target number of rotations of the scanning motor 103 and decelerates the scanning motor 103 if the number of rotations is higher. The CPU 110 controls the number of rotations of the scanning motor 103 based on the BD signal 107. Thus, the CPU 110 executes speed control for converging the scanning motor 103 to the target number of rotations. The CPU 110 outputs a laser drive signal 109 to the laser driving circuit 113 to control the semiconductor laser 100 to emit light at a predetermined timing within the full-scanning region 116. The CPU 110 may be included in the controller 320 or may be provided separately from the controller 320.

Laser Driving Circuit

Figure 1C:
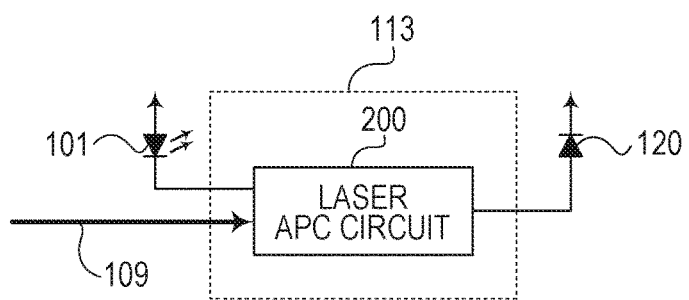
FIG. 1C illustrates a configuration of a laser driving circuit according to the first embodiment.
Figure 2A:
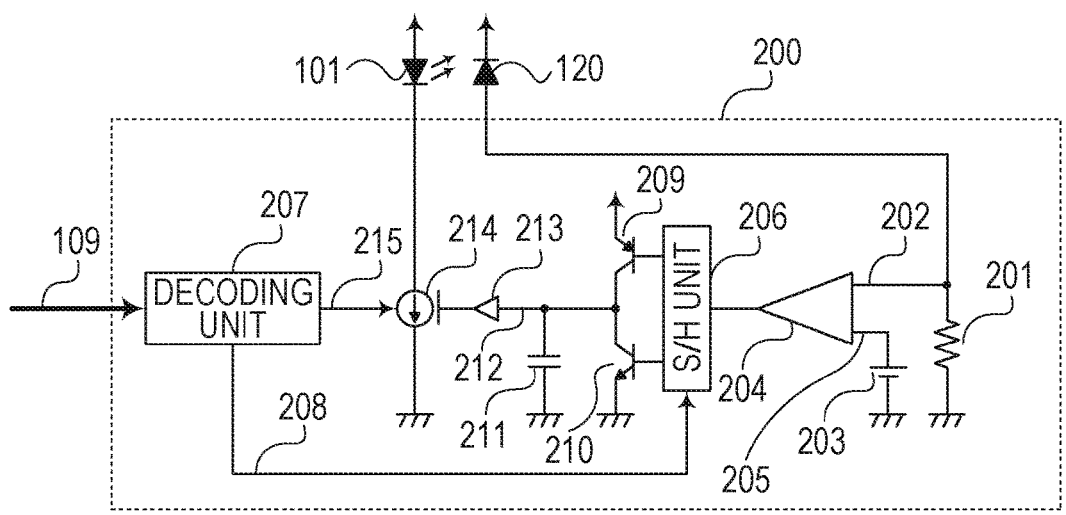
FIG. 2A illustrates a configuration of a laser APC circuit according to the first embodiment.

Next, control operations over the laser driving circuit 113 according to this embodiment will be described. with reference to FIG. 1C and FIG. 2A. FIG. 1C is a configuration diagram illustrating the laser driving circuit 113, and the laser driving circuit 113 has a laser APC circuit 200 configured to execute APC (Auto Power Control) operations for stabilizing the light quantity of the semiconductor laser 100. The laser diode 101 and photodiode 120 included in the semiconductor laser 100 and the laser drive signal 109 output from the CPU 110 are connected to the laser APC circuit 200.

APC Operations

Next, APC operations in the semiconductor laser 100 will be described. FIG. 2A illustrates a configuration of the laser APC circuit 200. The photodiode 120 is an element configured to monitor a light quantity in the laser diode 101 and output electric current substantially in proportion to the light quantity in the laser diode 101. The electric current output from the photodiode 120 is fed to an electrical resistance 201, and the electrical resistance 201 converts the electric current to voltage. The voltage 202 converted by the electrical resistance 201 is input to the comparator 204. In other words, the comparator 204 has one input terminal configured to receive the voltage 202 proportional to the light quantity of the laser diode 101. The comparator 204 has the other input terminal configured to receive a reference voltage 205 output from a reference voltage generating unit 203. The comparator 204 compares the voltage 202 and the reference voltage 205 and outputs the comparison result to a sample/hold unit (S/H unit) 206. The sample/hold unit 206 turns on an off a transistor 209 and a transistor 210 in accordance with a sample/hold timing signal 208 (hereinafter, simply called a timing signal 208) output from the decoding unit 207 and an output from the comparator 204. Here, the decoding unit 207 decodes the laser drive signal 109 and outputs the timing signal 208 and a light emission control signal 215.

In order to sample the light quantity in the laser diode 101, the decoding unit 207 controls the laser diode 101 to emit light so that the timing signal 208 notifies the sample/hold unit 206 of timing for sampling. The sample/hold unit 206 turns on the transistor 209 and turns off the transistor 210 it the voltage 202 proportional to the light quantity in the laser diode 101 is lower than the reference voltage 205. Thus, a hold capacitor 211 is charged, and the voltage 212 to be applied to the hold capacitor 211 increases. Conversely, the sample/hold unit 206 turns off the transistor 209 and turns on the transistor 210 if the voltage 202 proportional to the light quantity in the laser diode 101 is equal to or higher than the reference voltage 205. Thus, the hold capacitor 211 is discharged, and the voltage 212 to be applied to the hold capacitor 211 decreases. The voltage 212 to be applied to the hold capacitor 211 is buffered in the buffer 213 to control electric current in the constant current source 214. The electric current fed to the laser diode 101 is proportional to the voltage 212 applied to the hold capacitor 211. As the voltage 212 applied to the hold capacitor 211 increases, the electric current fed to the laser diode 101 increases. The constant current source 214 turns on and off the electric current to be fed to the laser diode 101 in accordance with the light emission control signal 215 output from the decoding unit 207.

By performing these operations, the light quantity in the laser diode 101 is adjusted to a light quantity depending on the resistance value of the electrical resistance 201 causing the voltage 202 proportional to the light quantity in the laser diode 101 and the reference voltage 205 when sampling is performed. The sample/hold unit 206 in a hold mode turns off both of the transistor 209 and the transistor 210 to hold the voltage 212 to be applied to the hold capacitor 211 and keeps the light quantity constant in the laser diode 101.

Control Upon Activation of Scanning Device

Figure 3:
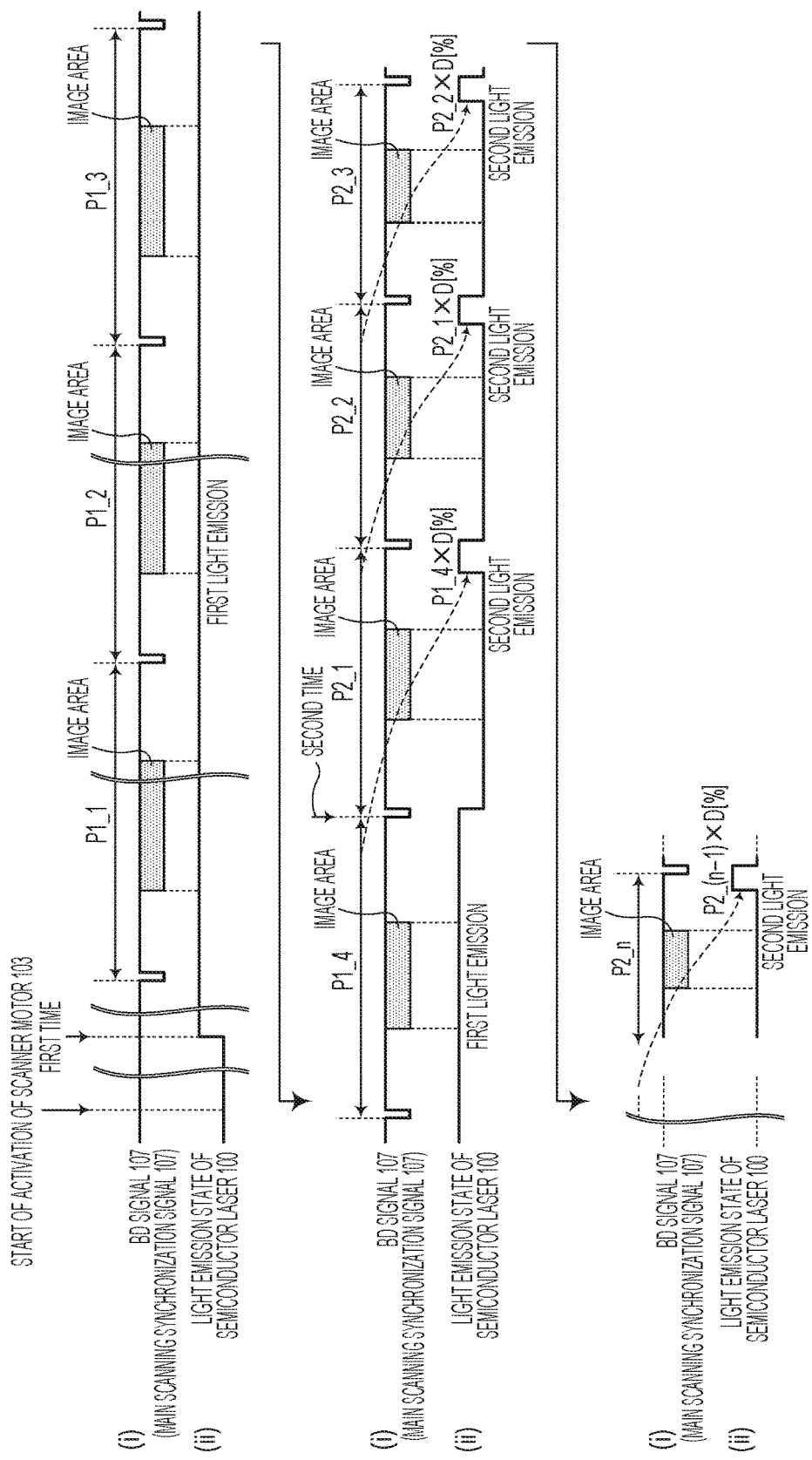
FIG. 3 is a timing chart illustrating activation control over the scanning device according to the first embodiment.

Next, control upon activation of the scanning device 111 according to this embodiment will be described with reference to FIG. 2B to FIG. 4. FIG. 2B illustrates a characteristic diagram (i) illustrating changes in the number of rotations from start of activation of the scanning motor 103 and having a horizontal axis indicating time period and a vertical axis indicating the number of rotations of the scanning motor 103 where the target number of rotations of the scanning motor 103 is indicated by a broken line. FIG. 2B further illustrates (ii) control states (such as stop and speed control) of the scanning motor 103 under control of the CPU 110 and (iii) control states (such as light-off, first light emission, and second light emission) of the semiconductor laser 100. In a first light emission state, laser light is applied to a full-scanning region 116 (image region 114 and non-image region 115) in a period from start of activation of the scanning motor 103 to when the number of rotations of the scanning motor 103 reaches a target number of rotations. In a second light emission state, laser light is applied to the non-image region 115 in a period from start of activation of the scanning motor 103 to when the number of rotations of the scanning motor 103 reaches a target number of rotations. References starting with "S" indicate step numbers in a flowchart in FIG. 4, which will be described below. FIG. 3 is a timing chart illustrating activation controls over the scanning device 111. FIG. 3 illustrates (i) a BD signal 107 output from the main-scanning synchronization sensor 106 to the CPU 110 and (iii) light emission states (such as a first light emission and a second light emission). The BD signal 107 has a high level when the main-scanning synchronization sensor 106 does not receive laser light and has a low level when the main-scanning synchronization sensor 106 receives laser light. The CPU 110 stores, as a BD cycle value (such as P1_1), a state of the BD signal 107 from a rising edge to a falling edge. In FIG. 3(i), a region corresponding to the image region 114 within a BD cycle is hatched. The semiconductor laser 100 has a light-off state having a low level and a light emission state having a high level in which the APC operations are performed.

Figure 4:
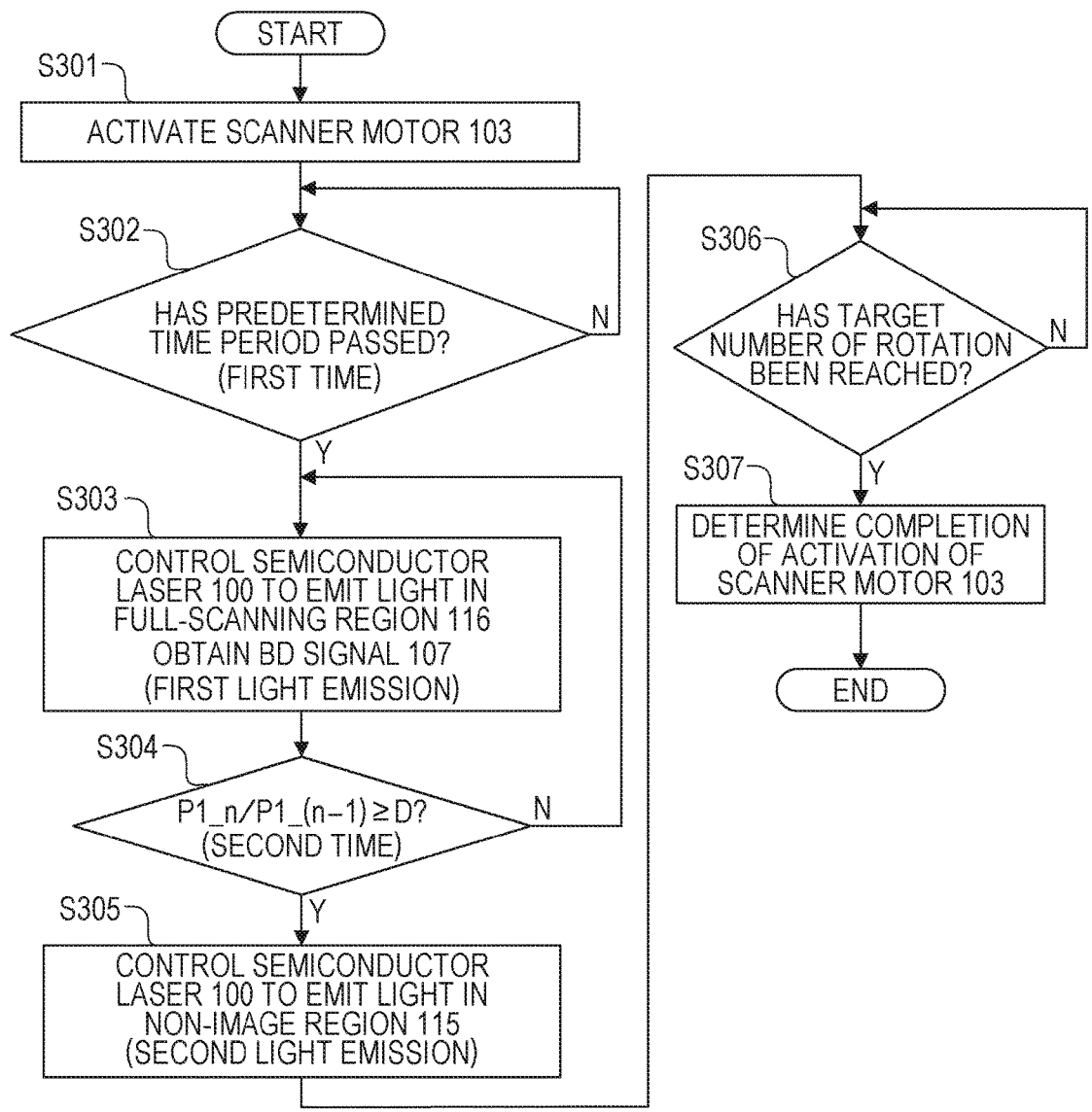
FIG. 4 is a flowchart illustrating the activation control over the scanning device according to the first embodiment.

FIG. 4 is a flowchart illustrating control upon activation of the scanning device 111. First of all, when the printer 300 is instructed to perform a print start, operation by an external apparatus, not illustrated, or an operating portion, not illustrated, the CPU 110 starts processing in step (hereinafter, called "S") 301 and subsequent steps at a predetermined timing from the print instruction occurs. In other words, the CPU 110 starts activation control over the scanning motor 103 and the semiconductor laser 100 by using the scanning motor drive signal 108. Before the activation of the scanning motor 103 is started, the scanning motor 103 has a deactivation state (FIG. 2B(ii)), and the semiconductor laser 100 has a light-off state (FIG. 2B(iii)).

In S301, the CPU 110 outputs the scanning motor drive signal 108 to activate the scanning motor 103. Here, the scanning motor 103 operates based on a set target number of rotations and in response to a speed control instruction from the CPU 110, and the rotation of the scanning motor 103 starts rotation of the rotatable polygonal mirror 102. In this case, the CPU 110 controls the semiconductor laser 100 to be in a light-off state (FIG. 2B(iii)), and the BD signal 107 is not generated in the main-scanning synchronization sensor 106 (FIG. 3(i)), which instructs to accelerate the scanning motor 103. The CPU 110 resets and starts a timer, not illustrated.

In S302, the CPU 110 determines with reference to the timer, not illustrated, whether a predetermined time period has passed or not. If the CPU 110 determines that the predetermined time period has not passed, the processing returns to S302. If the CPU 110 in S302 determines that the predetermined time period has passed or that the time reaches a first timing, the processing moves to S303. In S303, the CPU 110 at the first timing controls the semiconductor laser 100 to emit light over the full-scanning region 116 in the scanning device 111. The operation for controlling the semiconductor laser 100 to emit light over the full-scanning region 116 in the scanning device 111 at a first timing will be called first light emission (FIG. 3(ii)).

Why the first emission is performed at the first timing after a predetermined time period passed from start of activation of the scanning device 111 will be described next. When the first light emission is performed immediately after activation of the scanning motor 103, the scanning motor 103 is still rotating at a lower speed. Thus, larger energy than energy used for applying light for forming an image an a recording material is used for applying laser light to the photoconductive drum 105. This may possibly advance abrasion of the photoconductive drum 105. Therefore, the semiconductor laser 100 may be kept in the light-off state until the first timing from start of the activation of the scanning motor 103. The semiconductor laser 100 is then controlled to start light emission at the first timing after the scanning motor 103 has a stable acceleration state. When the APC operations with the first light emission increase the light quantity of the semiconductor laser 100, a BD signal 107 is started to be generated which depends on the laser light periodically received by the main-scanning synchronization sensor 106. The CPU 110 sequentially stores in a storage unit, not illustrated, a value (hereinafter, BD cycle value) of each BD cycle that is a signal cycle every time the main-scanning synchronization sensor 106 generates a BD signal 107. In other words, referring to FIG. 3, the CPU 110 sequentially stores BD cycle values $P1\_1$, $P1\_2$, $P1\_3$, . . . every time the first light emission results in generation of a BD signal 107. Here, because the speed of the scanning motor 103 is controlled to increase toward a target number of rotations, the length of the BD cycles gradually decreases. Generally, in a period having a lower number of rotations of the scanning motor 103, the scanning motor 103 accelerates greatly. Thus, stored BD cycle values tend to sequentially and rapidly decrease.

In S304, the CPU 110 determines whether a ratio ($P1\_n/P1\_(n-1)$) between two serial BD cycle values is equal to or higher than a set value D or not. In this case, the CPU 110 calculates a ratio between two serial BD cycle values every time the BD cycle values are updated and sequentially determines whether the ratio is equal to or higher than a predefined set value D[%] (or a predetermined value) or not. This determination will be called relative-value determination. In other words, the relative-value determination sequentially determines whether adjacent BD cycle values $P1\_(n-1)$ and $P1\_n$ among BD cycle values stored during a period for performing the first light emission satisfies a relationship of $P1\_n/P1\_(n-1) \geq D$ or not. The period for performing the first light emission will be called a first light emission period, hereinafter. The CPU 110 determines a timing for changing from a first light emission state to a second light emission state on the basis of a first cycle $P1\_(n-1)$ and a second cycle $P1\_n$ subsequent to the first cycle $P1\_(n-1)$ In this case, n is a positive integer.

For example, when the set value D[%] is defined to be equal to 80%, the CPU 110 sequentially determines in the following manner. That is, the CPU 110 sequentially determines whether the ratio between adjacent BD cycle values is equal to or higher than 80% or not, as in $P1\_2/P1\_1 \geq 80\%$, $P1\_3/P1\_2 \geq 80\%$, or $P1\_4/P1\_3 \geq 80\%$. It can be considered that The CPU 110 may determine a rate of change between adjacent BD cycle values. The CPU 110 may detect that the ratio between two serial (or adjacent) BD cycle values reaches a low value corresponding to the set value D[%] =80% being e predetermined value and determine whether the acceleration of the scanning motor 103 reaches a predetermined value or lower or not. In a case where the CPU 110 sequentially determines that, for example, $P1\_2/P1\_1 \geq 80\%$ is false, $P1\_3/P1\_2 \geq 80\%$ is false, and $P1\_4/P1\_3 \geq 80\%$ is true, the processing moves to S305 when the CPU 110 determines that $P1\_4/P1\_3 \geq 80\%$ is true. In a case where the CPU 110 determines that $P1\_n/P1\_(n-1)$ is lower than the set value D as in that $P1\_2/P1\_1 \geq 80\%$ is false and that $P1\_3/P1\_2 \geq 80\%$ is false, the processing returns to S303. Hereinafter, a timing when the CPU 110 determines satisfaction of a relationship of $P1\_n/P1\_(n-1) \geq D$ will be called a second timing.

In S305, the CPU 110 controls the semiconductor laser 100 to emit light in the non-image region 115 (FIG. 3(ii)). The control over the semiconductor laser 100 to emit light to the non-image region 115 will be called unblanking control, and the light emission in this control will be called second light emission. The CPU 110 at the second timing switches the light emission state of the semiconductor laser 100 from the first light emission state to the second light emission state.

The unblanking control to be performed in S305 will be described in detail. The CPU 110 at the second timing calculates a value $P1\_n \times D[\%]$ (such as $P1\_4 \times D[\%]$) acquired by multiplying a BD cycle value $P1\_n$ (such as $P1\_4$ in the example in FIG. 3) updated lastly by a predefined set value D. After the transition to the second light emission state, a value acquired by multiplying $P2\_(n-1)$ by D[%] is used (see FIG. 3). In the second light emission state, the CPU 110 controls the semiconductor laser 100 to emit light when P2_(n−1)×D[%] has passed from the generation of the BD signal 107 by the main-scanning synchronization sensor 106 where P2_(n−1)×D[%] is a fourth time period acquired on the basis of a BD cycle value. Immediately after the second timing, the CPU 110 controls the semiconductor laser 100 to obtain the next BD signal 107 when the calculated time period equal to P1_4×D[%] has passed from the timing when the BD signal 107 has been obtained. After the next BD signal 107 is obtained through the light emission, the semiconductor laser 100 is lighted off. The second light emission is performed at sequential timings determined when the stored BD cycle values P2_1, P2_2, P2_3, . . . and P2_n are updated. After the second timing, the CPU 110 shifts to the unblanking control state, as illustrated in FIG. 2B. As illustrated in FIG. 3, the semiconductor laser 100 in the unblanking control state is controlled to start to emit light when a predetermined time period passes from a rising edge of the BD signal 107. The predetermined time period may be acquired by 6 multiplying the lastly updated BD cycle value P1_(n−1) by a predefined set value D[%] as indicated by broken arrows in FIG. 3.

The light-off timing in the second light emission may be determined in the following manner. For example, the CPU 110 may control the semiconductor laser 100 to be in a light-off state immediately after a rising edge of the BD signal 107 is detected. Alternatively, for example, the CPU 110 may control the semiconductor laser 100 to be in a light-off state when a fifth time period passes from a timing when the semiconductor laser 100 starts to emit light on the basis of the previous BD cycle value P2_(n−1). The light-off timing may be acquired from P2_(n−1)×D1 (%) (D1=1%, 2%, etc.), for example. The light emission time period of the second light emission may be determined such that the CPU 110 can detect a rising edge of the BD signal 107 without applying laser light radiated from the semiconductor laser 100 to the image region 114 in the photoconductive drum 105.

In this case, because the scanning motor 103 is still being controlled to increase its speed to a target number of rotations, the BD cycles tend to decrease gradually. However, the rate of change between adjacent BD cycle values decreases more than that in the first light emission state. Thus, at a light emission timing for the next scanning determined from the lastly stored BD cycle value, the semiconductor laser 100 is controlled to emit light in the non-image region 115, and light emission control for obtaining the next BD signal 107 is continued. In other words, it is assumed that the set value D [%] is defined on the basis of the non-image region 115 and the next timing when the BD signal 107 is obtained.

In S306, the CPU 110 determines whether the scanning motor 103 has reached the target number of rotations or not. In this case, the CPU 110 may determine whether the scanning motor 103 has reached the target number of rotations on the basis of a result of determination on whether the number of rotations corresponding to the current BD cycle has reached to 1% or lower of the target number of rotations or not, for example. If the CPU 110 determines in S306 that the scanning motor 103 has not reached the target number of rotations, the processing is returned to S306. If the CPU 110 determines that the scanning motor 103 has reached the target number of rotations, the processing moves to S307. In S307, the CPU 110 determines the completion of the activation of the scanning motor 103. According to this embodiment, as described above, the light quantity of the semiconductor laser 100 for image forming can be stabilized by the APC operations with light emission for obtaining the BD signals 107 before the activation of the scanning motor 103 completes.

Here, the first light emission as described above is light emission for acquiring a BD cycle value to start second light emission after the relative-value determination is performed. In other words, the first light emission emits light over the full-scanning region 116 in the scanning device 111. Thus, laser light is applied to the substantially entire region of the photoconductive drum 105 including the image region 114 on the photoconductive drum 105 in a period when image forming is not performed. In order to limit the region of the photoconductive drum 105 to which laser light is applied, laser light may be applied in a time period as short as possible so that the second light emission can be start at a stage as early as possible. On the other hand, the unblanking control may be executed in a case where it is determined that a rate of change between the previously stored BD cycle value and a BD cycle value to be stored upon obtaining the next BD signal 107 has reached a lower value corresponding to the set value D[%]. For that, in a case where the unblanking control is attempted to be started in a case where the condition above is not satisfied, for example, during a period in which the number of rotations of the scanning motor 103 is low, laser light may not possibly be emitted when the next BD signal 107 is generated. Then, there is a possibility that the laser light emission is to be continued until the timing when the BD signal 107 is generated after the next generation of the BD signal 107. In this case, because the BD signal 107 has not been obtained, the stored BD cycle value is different from the true BD cycle value. In order to obtain a true BD cycle value again, laser light is to be continued until the timing when the BD signal 107 is generated at least after the next generation of the BD signal 107. This results in a longer time period for emitting light across the full-scanning region 116 in the scanning device 111. Therefore, in order to reduce toe time period for the first light emission as much as possible, the CPU 110, as described above, may perform the relative-value determination to determine whether a condition for transition from the first light emission state to the second light emission state is satisfied or not.

Immediately after the second timing when the satisfaction of a transition condition to the unblanking control is determined based on a result of the relative-value determination in a period for performing the first light emission of the semiconductor laser 100, transition to the unblanking control is executed. Under the unblanking control, the semiconductor laser 100 is emitted to the non-image region 115 while activation control is executed over the scanning motor 103.

According to this embodiment, the configurations and the control method as described above may be applied to reduce as much as possible the time period having the first light emission state in which a quantity of laser light more than necessary is applied to the photoconductive drum 105 upon activation of the scanning device 111. This can prevent deterioration of the photoconductive drum 105. Also in the second light emission state, the APC operations may be executed which applies the semiconductor laser 100 to the non-image region 115 to stabilize the quantity of the semiconductor laser 100 to a predetermined light quantity before the activation of the scanning motor 103 completes. This can contribute to reduction of a first print output time of the image forming apparatus. This embodiment can, in activating a scanning device, avoid application of laser light more than necessary to a photosensitive member and stabilize a laser element to a predetermined light quantity until image forming is started, as described above.

Second Embodiment

Figure 5:
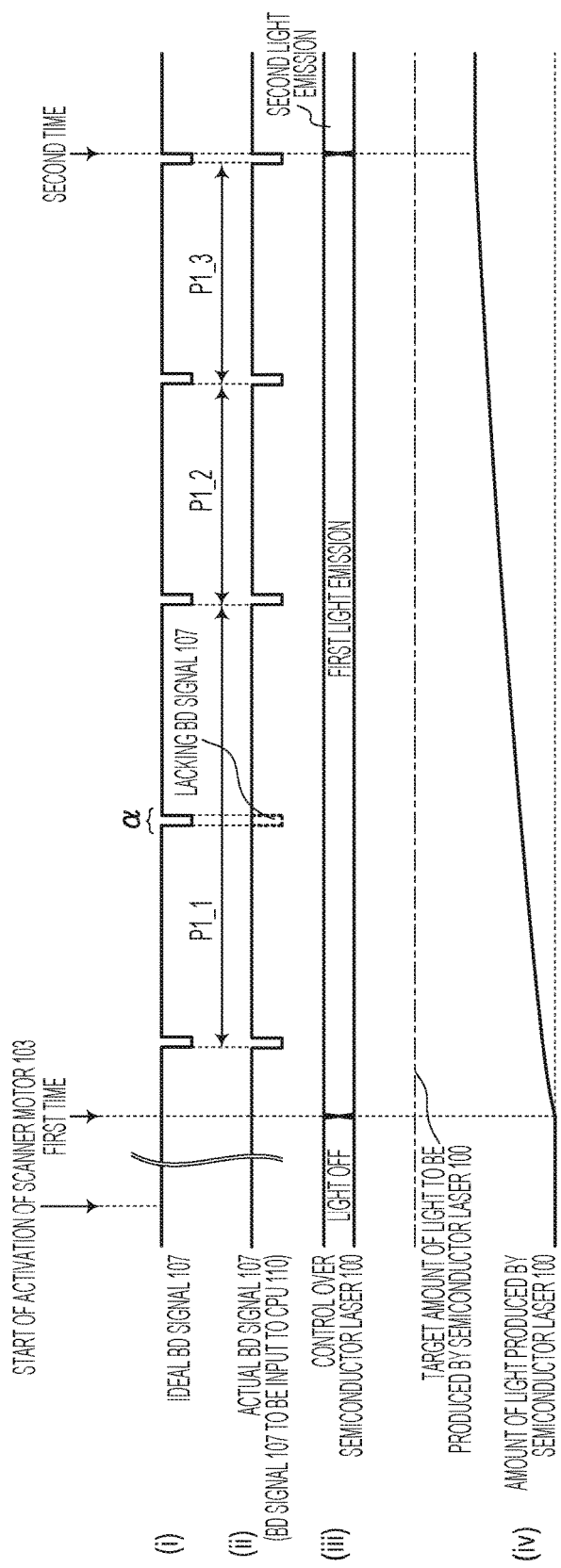
FIG. 5 is a timing chart illustrating activation control over a scanning device according to the second embodiment.
Figure 6:
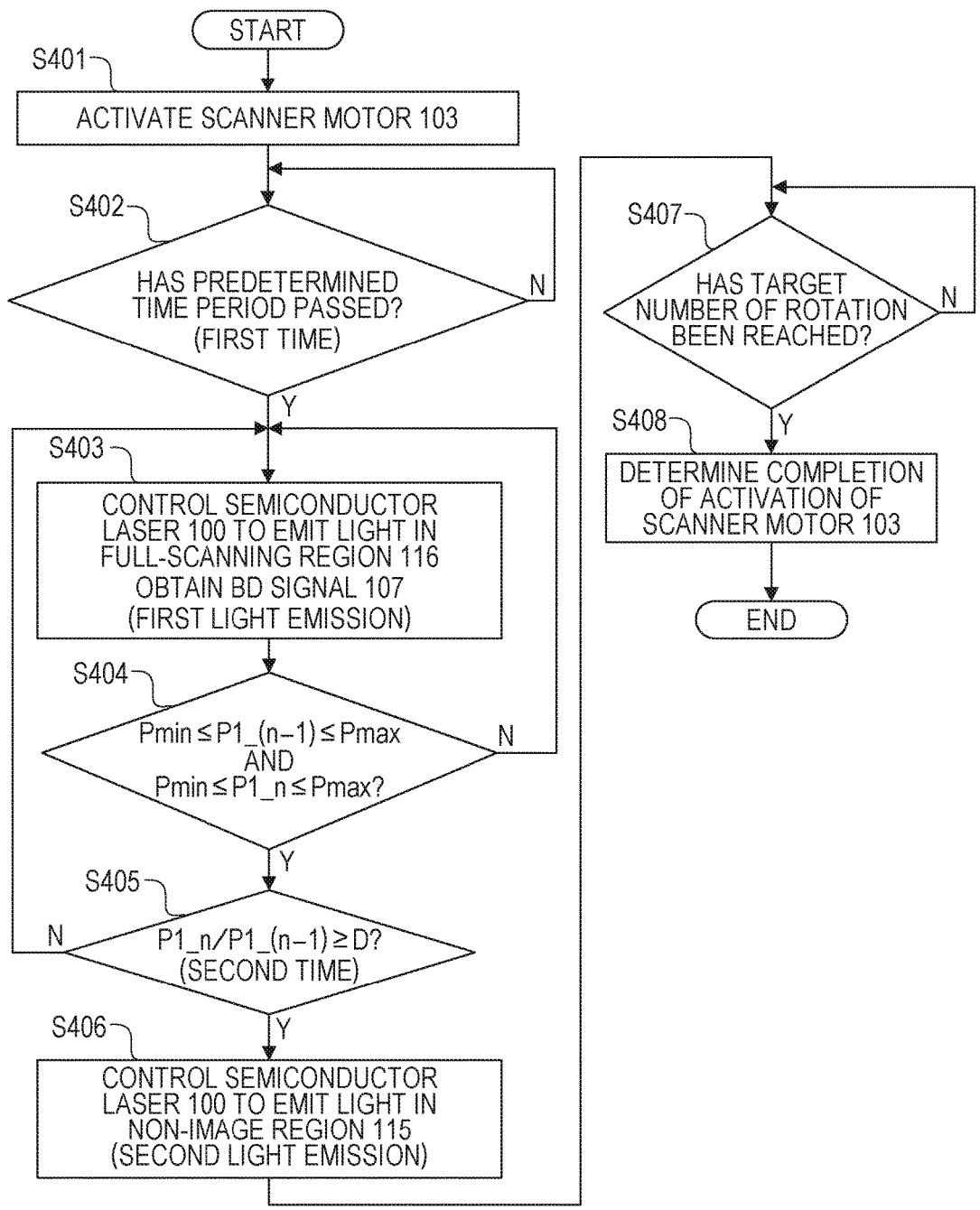
FIG. 6 is a flowchart illustrating the activation control over the scanning device according to the second embodiment.

With reference to FIGS. 5 and 6, a scanning device 111 according to a second embodiment will be described. This embodiment is different from the first embodiment in a method for determining a second timing. Like numbers refer like parts in the first and second embodiments, and any repetitive description will be omitted. A control method according to this embodiment will be described which adds determination on whether an absolute value of a stored BD cycle value falls within a predetermined threshold value range or not to the control which performs the relative-value determination to determine satisfaction of a transition condition to the unblinking control as in S304 in FIG. 4 according to the first embodiment.

FIG. 5 is a timing chart illustrating activation control over the scanning device 111. FIG. 5(i) illustrates an ideal BD signal 107 expected to be generated when the main-scanning synchronization sensor 106 receives laser light. FIG. 5(ii) illustrates an actual BD signal 107 indicating (by a broken line) a where the level of the light quantity of the case semiconductor laser 100 is still low, a BD signal 107 is not generated, which results in a dropout of a BD signal 107, even though the main-scanning synchronization sensor 106 receives the laser light. FIG. 5(ii) indicates a BD signal 107 to be actually input to the CPU 110. FIG. 5(iii) indicates control states (light-off, first light emission, etc.) of the semiconductor laser 100, and FIG. 5(iv) indicates the light quantity of the semiconductor laser 100 where the target light quantity of the semiconductor laser 100 is indicated by a long dashed short dashed line. FIG. 6 is a flowchart illustrating activation control over the scanning motor 103 according to this embodiment. The processing in S401 and S402 is the same as the processing in S301 and S302 in FIG. 4, and any repetitive description will be omitted. The CPU 110 in S403 at a first timing performs first light emission which emits the semiconductor laser 100 across the full-scanning region 116 in the scanning device 111 (FIG. 5(iii)). Because the first light emission is started, the CPU 110 obtains a BD signal 107. The APC operations with the first light emission increase the light quantity of the semiconductor laser 100 toward a target light quantity set in the laser driving circuit 113 (FIG. 5(iv)).

Here, as indicated in (i) and (ii) in FIG. 5 (hereinafter, FIG. 5(i) and FIG. 5(ii)), when the semiconductor laser 100 emits a low level of light quantity, a BD signal 107 is not generated, which may possibly result in a dropout of a BD signal 107 even though the main-scanning synchronization sensor 106 receives the laser light. In this case, the CPU 110 sequentially storing BD cycle values every time a BD signal 107 is generated may improperly recognize a BD cycle value P1_n as a different value from the BD cycle value corresponding to the actual number of rotations of the scanning motor 103. For example, at a timing α in FIG. 5(i) and FIG. 5(ii), a BD signal 107 is ideally generated. However, a BD signal 107 is dropped out. As a result, the CPU 110 stores a time period two times the ideal BD cycle value of the BD signal 107 as the BD cycle value P1_1.

The misrecognition of a BD cycle value due to such a BD signal 107 dropout phenomenon may occur or may not occur with passage of time when the semiconductor laser 100 still emits a low level of light quantity. A series of misrecognitions of BD cycle values may possibly results in improper determination of satisfaction of a transition condition to the unblaking control in the processing of the relative-value determination. When the unblanking control is performed with misrecognized BD cycle values may cause mismatching between speed control over the scanning motor 103 and light emission control over the semiconductor laser 100, which may prevent a predetermined activation control from being executed over the scanning device 111.

In order to avoid the BD signal misrecognition phenomenon, the CPU 110 sequentially stores BD cycle values every time a BD signal 107 is generated and further performs the following determination. That is, in S404, the CPU 110 determines whether a stored BD cycle value falls within a predetermined threshold value range based on an elapsed time from start of activation of the scanning motor 103. Hereinafter, this determination will be called absolute-value determination. The absolute-value determination determines whether two serial BD cycle values P1_(n−1) and P1_n of BD cycle values stored during the first light emission period fall within a predetermined range or not. More specifically, whether two serial BD cycle values P1_(n−1) and P1_n satisfy Pmin P1_(n−1)≤Pmax and Pmin≤P1_n≤Pmax or not is sequentially determined. According to this embodiment, if the absolute-value determination determines that both of the adjacent BD cycle values (P1_(n−1) and P1_n) do not fall within the predetermined range, the relative-value determination is not performed. The minimum value Pmin and the maximum value Pmax in the absolute-value determination function as a filter for determining a BD cycle value is not deviated from a predetermined range. It is assumed that Pmin and Pmax are a minimum value and a maximum value, respectively, of a predetermined threshold range and that n is a positive integer.

As an example, a case will be described in which an elapsed time from start of activation of the scanning motor 103 is approximately equal to 100 msec (milliseconds) in the processing of storing BD cycle values P1_1, P1_2, P1_3, and so on under the control of the CPU 110. The BD cycle value around the timing passed by approximately 100 msec from start of activation of the scanning motor 103 is set within a range of 1.0 msec to 1.5 msec on the basis of the assumed number of rotations of the scanning motor 103. In other words, in accordance with the settings, a minimum value Pmin of a predetermined threshold value is set to 1.0 msec, and a maximum value Pmax of the predetermined threshold value is set to 1.5 msec. The CPU 110 determines whether the sequentially stored BD cycle values satisfy Pmin P1_(n−1)≤Pmax and Pmin≤P1_n≤Pmax or not. For example, the CPU 110 evaluates the absolute value of a BD cycle value such as 1.0 msec≤P1_1≤1.5 msec or not, 1.0 msec≤P1_2≤1.5 msec or not, or 1.0 msec≤P1_3≤1.5 msec or not. The minimum value Pmin and maximum value Pmax of a predetermined threshold value range are set in consideration of variations of activation performance among manufactured scanning motors 103. The set minimum value Pmin and the maximum value Pmax may be prestored in a ROM, not illustrated, for example, as parameters in design.

As illustrated in FIG. 5, when the CPU 110 misrecognizes the BD cycle value P1_1, it is determined that 1.0 msec≤P1_1≤1.5 msec is not satisfied. Thus, the CPU 110 can determine that the BD cycle value P1_1 is a misrecognized BD cycle value caused by a dropout of a BD signal 107. The CPU 110 determines in S404 that Pmin≤P1_(n−1)≤Pmax and Pmin≤P1_n≤Pmax are not satisfied, the processing returns to S403 where the first light emission state is maintained. The CPU 110 determines in S404 that Pmin≤P1_(n−1)≤Pmax and Pmin≤P1_n≤Pmax are satisfied, the processing moves to S405. For example, the CPU 110 may determine that the BD cycle values P1_2 and P1_3 satisfy the condition in the absolute-value determination and determines that the BD cycle values P1_2 and P1_3 are equivalent to the ideal BD signal 107 (FIG. 5(*i*), FIG. 5(*ii*)). The CPU 110 performs the relative-value determination in S405 on the BD cycle values P1_2 and P1_3. Because the processing in S405 to S408 is the same as the processing in S304 to S307 in FIG. 4, any repetitive description will be omitted. However, if it is determined in S405 that the CPU 110 does not reach the second timing, the processing returns to S403. When the CPU 110 determines that the BD cycle values P1_2 and P1_3 are equivalent to the ideal BD signal 107, for example, the relative-value determination is performed like the first embodiment. At the second timing when P1_3/P1_2≥80% is satisfied, the CPU 110 starts the unblanking control.

In a period when the first light emission with the semiconductor laser 100 is performed, the relative-value determination is performed after the absolute-value determination is performed. Immediately after the second timing when the satisfaction of the transition condition to the unblanking control is determined, the unblanking control is enabled under which the semiconductor laser 100 is emitted to the non-image region 115 while the activation control is performed over the scanning motor 103.

Performing these controls can improve the certainty of determination of satisfaction of the transition condition to the unblanking control in addition to the effect of the first embodiment. This can prevent in advance mismatching between the speed control over the scanning motor 103 and the light emission control over the semiconductor laser 100. This embodiment can, in activating a scanning device, avoid application of laser light more than necessary to a photosensitive member and stabilize a laser element to a predetermined light quantity until image forming is started, as described above.

Third Embodiment

Figure 7A:
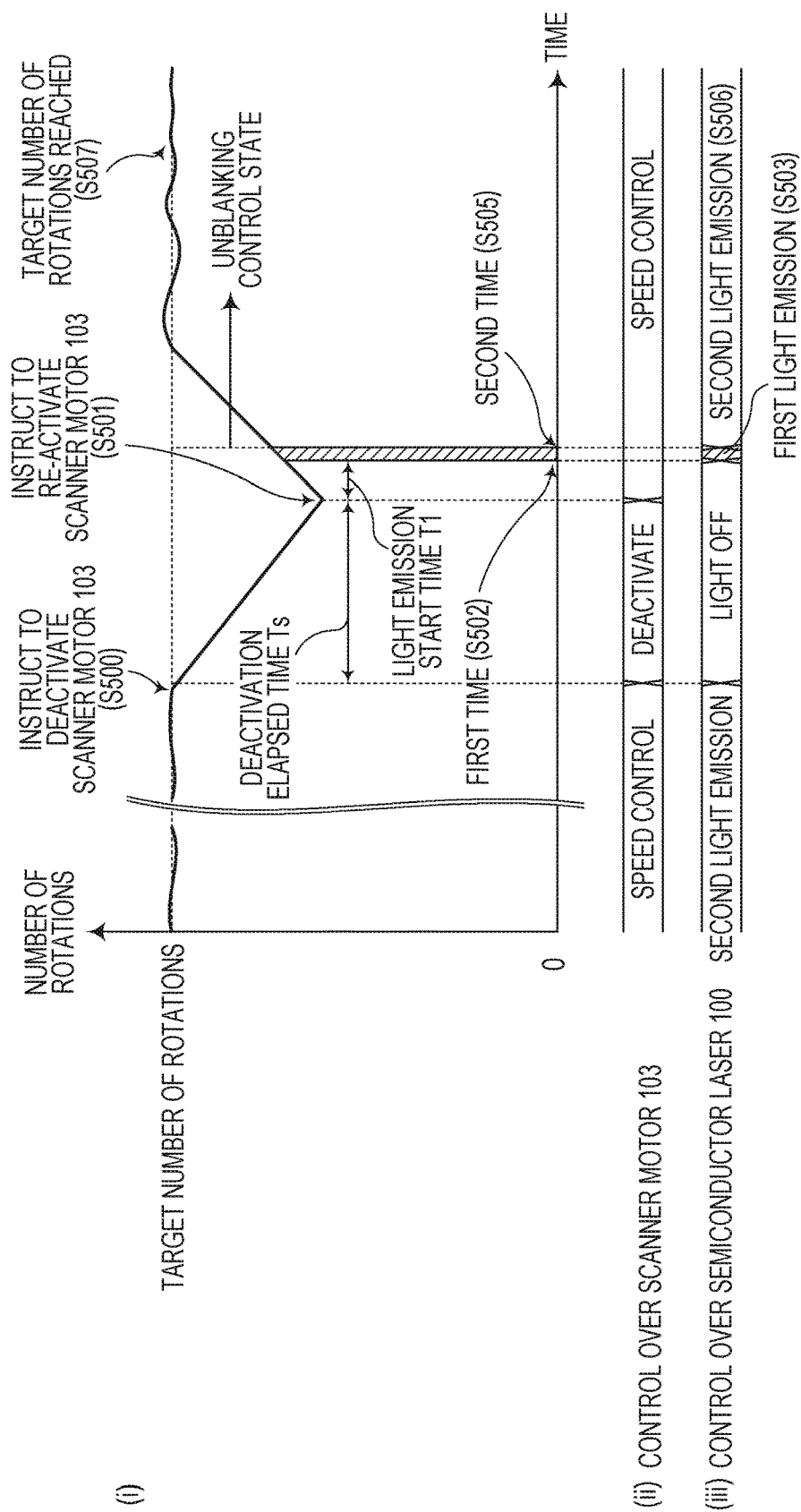
FIG. 7A illustrates changes in the number of rotations of a scanning motor according to the third embodiment.
Figure 7B:
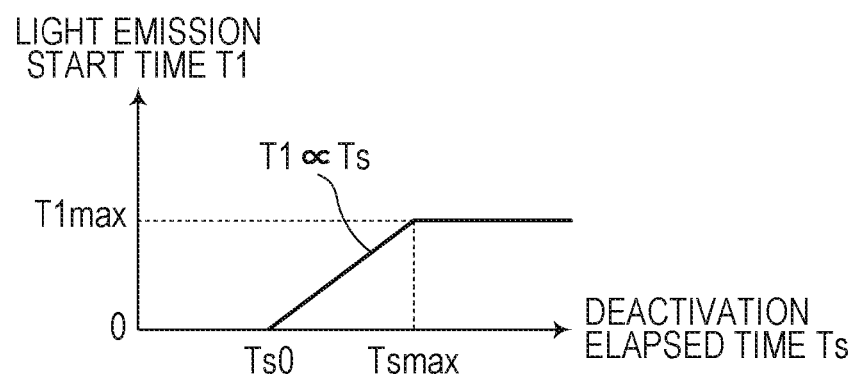
FIG. 7B illustrates a relationship between deactivation elapsed time and light emission starting time.
Figure 8:
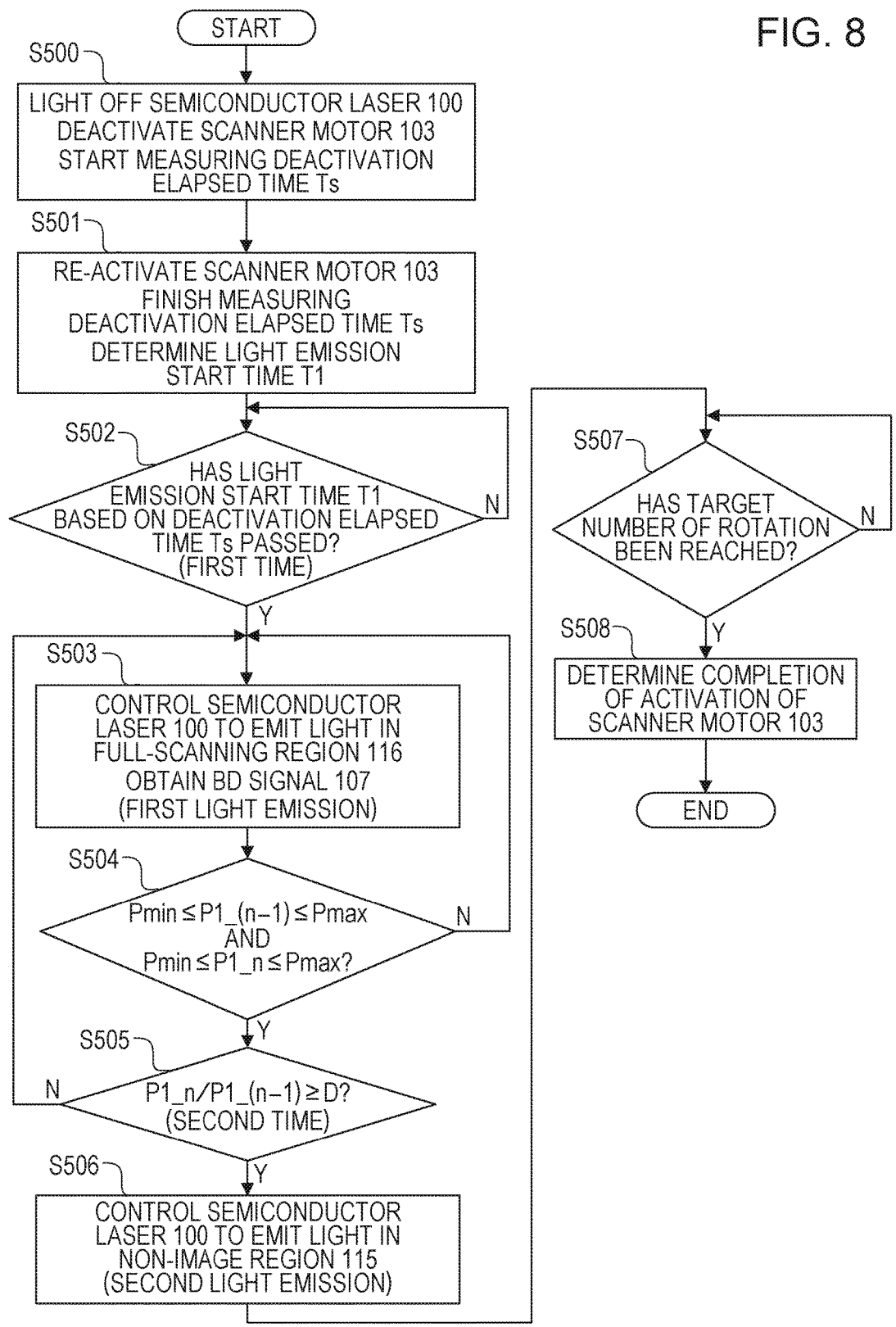
FIG. 8 is a flowchart illustrating re-activation control over the scanning device according to the third embodiment.

With reference to FIGS. 7A and 7B and FIG. 8, a scanning device 111 according to a third embodiment will be described. This embodiment is different from the first and second embodiments in method for determining a first timing and method for determining the predetermined threshold value in the absolute-value determination. Like numbers refer to like parts in the first and second embodiments, and any repetitive description will be omitted.

According to this embodiment, a control method for determining a first timing on the basis of a time period (hereinafter, deactivation elapsed time) from reception of an instruction (hereinafter, called a deactivation instruction) to deactivate the scanning motor 103 to reception of an instruction (hereinafter called a re-activation instruction) to re-activate the scanning motor 103. Another control method will further be described which determines the predetermined threshold value in the absolute-value determination on the basis of the deactivation elapsed time and an elapsed time from reception of an instruction (hereinafter, called an activation instruction) to activate the scanning motor 103. In other words, the control method according to the first and second embodiments is executed in response to an activation instruction received when the scanning motor 103 is completely deactivated. According to this embodiment, on the other hand, the control method is executed in response to a re-activation instruction received before the scanning motor 103 is completely deactivated after receiving a deactivation instruction. According to this embodiment, the CPU 110 is configured to acquire a predetermined time period for acquiring the first light emission state of the semiconductor laser 100 after the scanning motor 103 starts to rotate on the basis of the time period from deactivation of the scanning motor 103 to start of activation thereof.

States of Number of Rotations of Scanning Motor

FIG. 7A(i) is a characteristic diagram illustrating changes in the number of rotations when a re-activation instruction for the scanning motor 103 is received after a deactivation instruction thereof is received and has a horizontal axis indicating time period and a vertical axis indicating the number of rotations of the scanning motor 103. Because FIG. 7A(i) to FIG. 7A(iii) are similar to FIG. 2B(i) to FIG. 2B(iii), and repetitive descriptions regarding presentation of the drawings will be omitted. FIG. 8 is a flowchart illustrating controls according to this embodiment, and the step numbers in the flowchart in FIG. 8 corresponds to the step numbers in FIG. 7A. In S500, the CPU 110 controls the semiconductor laser 100 to be in a light-off state when a print operation completes in the printer 300, instructs the scanning motor 103 to deactivate, resets and starts a timer, not illustrated, and starts measuring a deactivation elapsed time Ts (FIG. 7A(i)). The number of rotations of the scanning motor 103 gradually decreases toward the complete deactivated state with passage of time (FIG. 7A(i)).

Next, a case will be examined in which the printer 300 receives a print start instruction before the scanning motor 103 is completely deactivated and the CPU 110 transmits a re-activation instruction to the scanning motor 103. In the control method according to the second embodiment, the semiconductor laser 100 at the first timing has a light-off state (FIG. 7A(iii)), and a BD signal 107 is not generated. Therefore, the scanning motor 103 has a forced acceleration state. Here, if the predetermined time to the first timing is determined as a fixed time period, the following operations are to be performed. For example, in a case where the time period from a deactivation instruction to a re-activation instruction transmitted to the scanning motor 103 is extremely short, the scanning motor 103 is forced to accelerate until the number of rotations of the scanning motor 103 exceeds a target number of rotations, resulting in an overshoot. A more time period may possibly be required until the overshot number of rotations of the scanning motor 103 reaches a target number of rotations. According to this embodiment, the CPU 110 in S501 re-activates the scanning motor 103 when the scanning motor 103 receives a re-activation instruction and completes the measurement of the deactivation elapsed time Is by using the timer. The CPU 110 determines a light emission starting time T1 (FIG. 7A(i)) to the first timing on the basis of the acquired value of the deactivation elapsed time Ts. The CPU 110 resets and starts the timer, not illustrated, to measure the time period from the re-activation of the scanning motor 103.

FIG. 7B illustrates a relationship between deactivation elapsed time Ts and light emission starting time T1 and has a horizontal axis indicating deactivation elapsed time Ts and a vertical axis indicating light emission starting time T1. The CPU 110 calculates the light emission starting time T1 (T1∝Ts) having a value proportional to the value of the deactivation elapsed time is on the basis of the relationship in FIG. 7B to determine the first timing. As the time period (Ts) from the deactivation to start of activation of the scanning motor 103 increases, the light emission starting time T1 to be set by the CPU 110 increases. If the value of the deactivation elapsed time Ts is equal to or longer than a second time period Tsmax (equal to or longer than a second time period) which is a sufficiently high value, the CPU 110 determines that the re-activation instruction is given after the scanning motor 103 is completely deactivated. The CPU 110 sets a third time period T1max corresponding to Tsmax as the light emission starting time T1. Setting a predetermined maximum value T1max as the light emission starting time Ti also causes the scanning motor 103 to be activated after it is completely deactivated, as in the first and second embodiments. In other words, the predetermined maximum value T1max is the same as the "predetermined time period" in S302, for example, in FIG. 4. On the other hand, if the deactivation elapsed time Ts has a value equal to or shorter than a first time period Ts 0 (equal to or shorter than a first time period), the CPU 110 determines that a re-activation instruction is given at a relatively earlier timing from a deactivation instruction given for the scanning motor 103 and does not maintain the light emission starting time T1 (T1=0). In other words, the CPU 110 starts activating the scanning motor 103 shortly after a re-activation instruction for the scanning motor 103 is received. The light emission starting time T1 is equal to an elapsed time period from reactivation of the scanning motor 103.

In S502, the CPU 110 determines whether the light emission starting time T1 based on the deactivation elapsed time Ts determined in S501 has passed or not, that is whether the first timing has been reached or not with reference to the timer. If the CPU 110 in S502 determines that the light emission starting time T1 has passed, the processing returns to S502. If the CPU 110 in S502 determines that the light emission starting time T1 has passed, that is, the first timing has been reached, the processing moves to S503. In S503, the CPU 110 at the first timing starts the first light emission state in which the semiconductor laser 100 is controlled to emit over the full-scanning region 116 in the scanning device 111 (FIG. 7A(iii)). Because the processing in S503 to S508 is the same as the processing in S403 to S408 in FIG. 6, any repetitive description will be omitted.

However, according to this embodiment, in order to perform the absolute-value determination in S504, the CPU 110 performs a control to adjust the predetermined threshold value in the absolute-value determination on the basis of the deactivation elapsed time Ts and the elapsed time period from reception of the re-activation instruction by the scanning motor 103, that is, the light emission starting time T1. For example, when the sum of the deactivation elapsed time Ts and the light emission starting time T1 is approximately equal to 200 msec, the predetermined threshold value is set in the following manner. In this case, the BD cycle value around the first timing is estimated to fall within a range of 500 μsec (microseconds) to 1.0 msec from the assumed number of rotations of the scanning motor 103. The minimum value Pmin and the maximum value Pmax of the predetermined threshold value in the absolute-value determination are set to 500 μsec and 1.0 msec, respectively ye The minimum value Pmin and maximum value Pmax of the threshold value in the absolute-value determination are determined on the basis of the deactivation elapsed time Ts and the light emission starting time T1, as described above. In the processing of re-activation control over the scanning motor 103, a control is performed for maintaining the certainty of the determination of satisfaction of a transition condition to the unblanking control.

According to this embodiment, the control over the scanning motor 103 to reach a target number of rotations is executed in the processing of the re-activation control by preventing as much as possible an overshoot departing from the target number of rotations, in addition to the effects of the first and second embodiments. This embodiment can, in activating a scanning device, avoid application of laser light more than necessary to a photosensitive member and stabilize a laser element to a predetermined light quantity until image forming is started, as described above.

Fourth Embodiment

Figure 9:
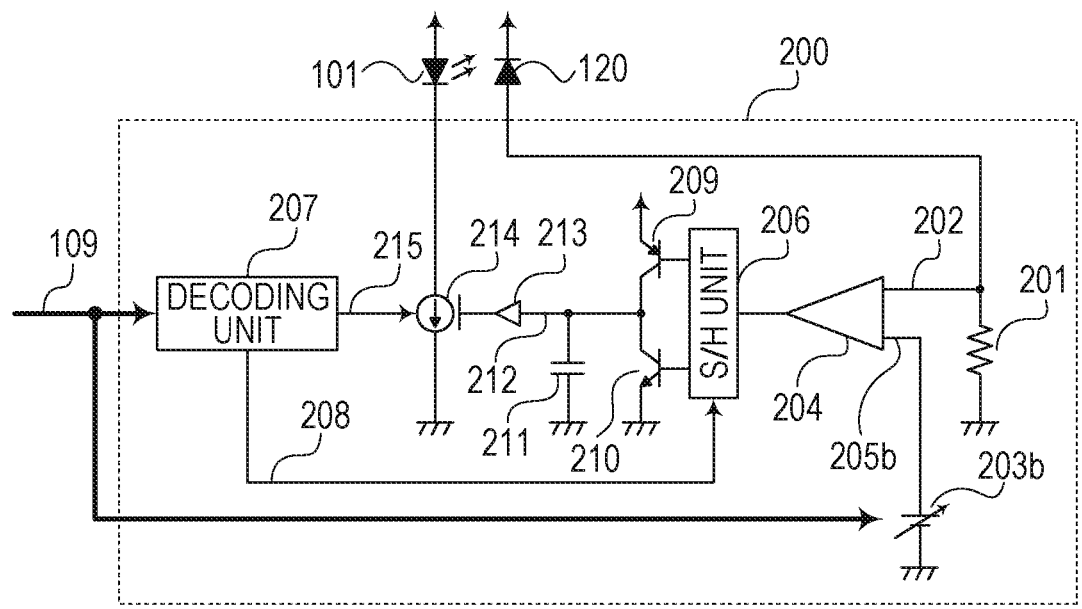
FIG. 9 illustrates a configuration of a laser APC circuit according to the fourth embodiment.
Figure 10:
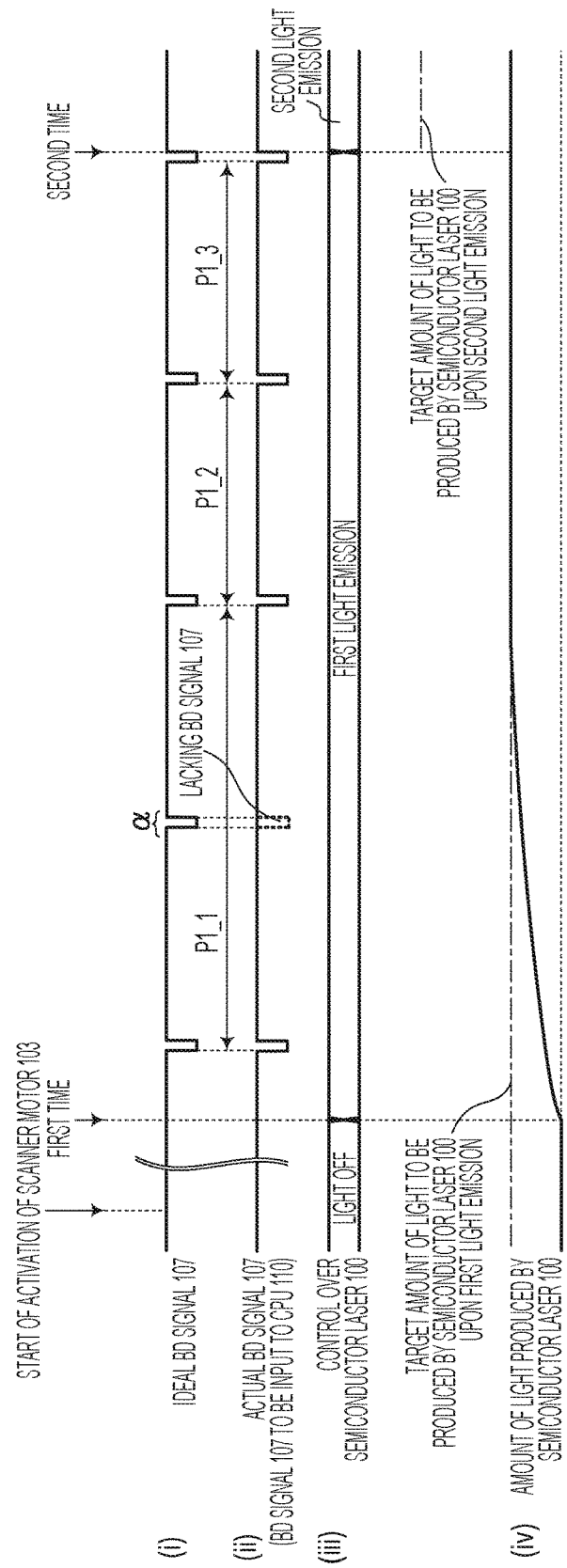
FIG. 10 is a timing chart illustrating activation control over the scanning device according to the fourth embodiment.
Figure 11:
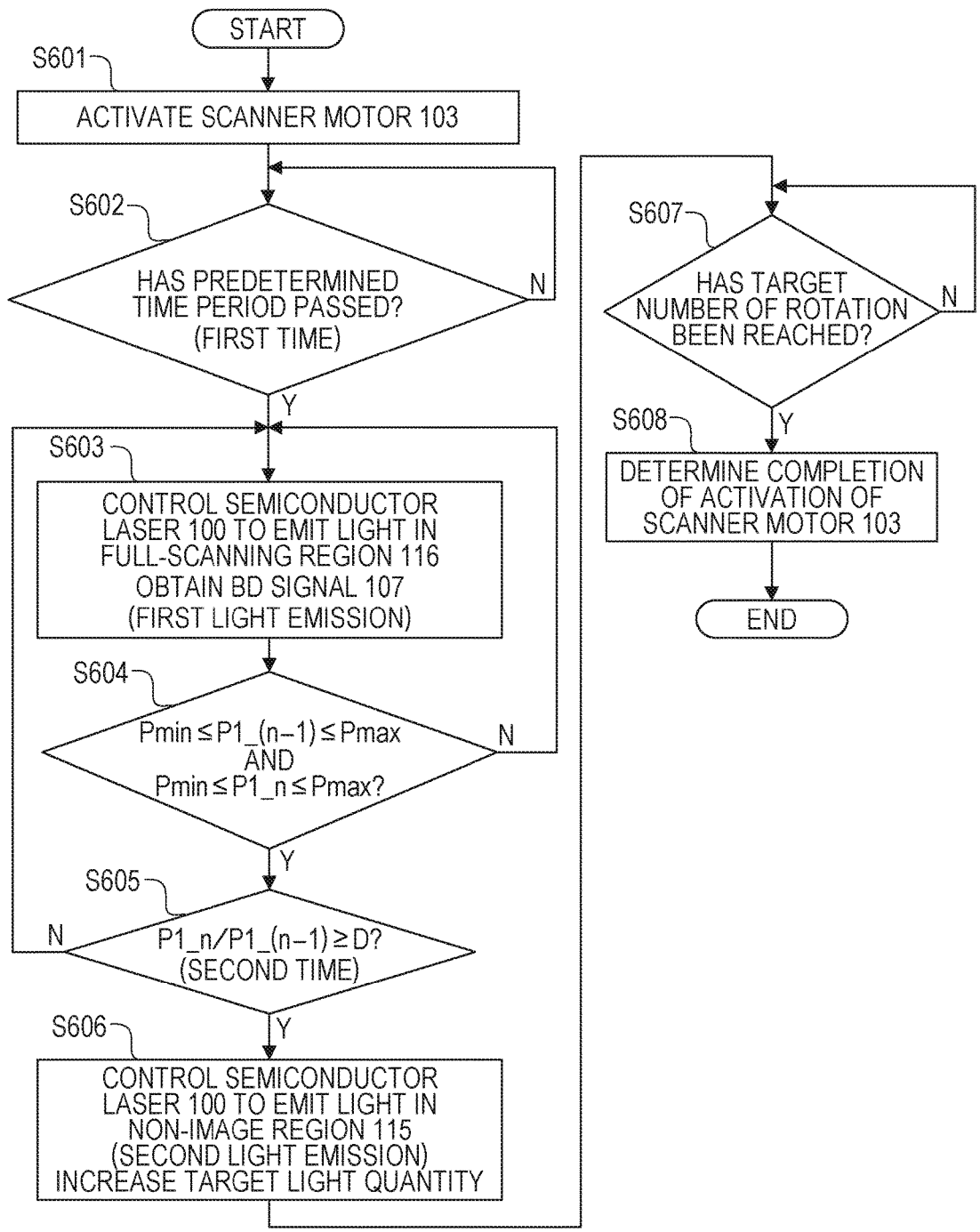
FIG. 11 is a flowchart illustrating the activation control over the scanning device according to the fourth embodiment.

With reference to FIGS. 9 to 11, a scanning device 111 according to a fourth embodiment will be described. This embodiment is different from the first to third embodiments in control method for setting a target light quantity of the semiconductor laser 100 in a first light emission to be lower than a target light quantity in a second light emission. Like numbers refer to like parts in the first to fourth embodiments, and any repetitive description will be omitted. According to this embodiment, a control method will be described which adds setting a target light quantity in a first light emission to be lower than a target light quantity in a second light emission to the control which determines a transition condition to the unblanking control according to the first to third embodiments.

Laser APC Circuit

FIG. 9 is a configuration diagram of a laser APC circuit 200 according to this embodiment which has a function of adjusting and setting a reference voltage 205b to be output from the reference voltage generating unit 203b in accordance with a laser drive signal 109. Like numbers refer to like parts in FIG. 2A and FIG. 9, and any repetitive description will be omitted. In other words, the CPU 110 has a function of changing the target light quantity of the semiconductor laser 100 in accordance with the laser drive signal 109. FIG. 10 is a timing chart illustrating an activation control over the scanning device 111 where (i) to (iv) in FIG. 10 correspond to (i) to (iv) in FIG. 5, any repetitive description on which will be omitted. According to this embodiment, referring to (iv) in FIG. 10, the target light quantity in the first light emission is different from the target light quantity in the second light emission, and the target light quantity in the first light emission is set to be lower than the target light quantity in the second light emission. This point is different from the point that an equal target light quantity is set in the first light emission and in the second light emission, as in (iv) in FIG. 5.

Activation Control of Scanning Motor

FIG. 11 is a flowchart illustrating activation control over the scanning motor 103 according to this embodiment. Because the processing in S601 to S603 is the same as the processing in S401 to S403 in FIG. 6, any repetitive description will be omitted. Referring to (iv) in FIG. 10, the target light quantity of the semiconductor laser 100 in the first light emission in S603 is set enough for generating a BD signal 107 when the main-scanning synchronization sensor 106 receives laser light. However, the target light quantity of the semiconductor laser 100 in the first light emission is set to be lower than a predetermined light quantity suitable for image forming. In this case, the amount of energy for applying laser light more than necessary to the photoconductive drum 105 in the first light emission can further be reduced. Also in this case, on the other hand, because the target light quantity of the semiconductor laser 100 is set to a value enough for generating a BD signal 107, the CPU 110 can evaluation serial BD cycle values every time the BD cycle value is updated.

Because the processing in S604 to S606 is the same as the processing in S404 to S406 in FIG. 6, any repetitive description will be omitted. The CPU 110 in S606 changes the target light quantity of the semiconductor laser 100 in the second light emission to a light quantity higher than the target light quantity in the first light emission such as a value corresponding to the predetermined light quantity suitable for image forming, as in (iv) in FIG. 10. Because the processing in S607 and S608 is the same as the processing in S407 and S408 in FIG. 6, any repetitive description will be omitted. The configuration of this embodiment is applicable to a configuration in which the scanning motor 103 according to the third embodiment is instructed to reactivate before the scanning motor 103 is completely deactivated.

With this configuration according to this embodiment, the amount of energy for applying laser light more than necessary to the photoconductive drum 105 can further be reduced, in addition to the effects of the first to third embodiments. This embodiment can, in activating a scanning device, avoid application of laser light more than necessary to a photosensitive member and stabilize a laser element to a predetermined light quantity until image forming is started, as described above.

An embodiment can, in activating a scanning device, avoid application of laser light more than necessary to a photosensitive member and stabilize a laser element to a predetermined light quantity until image forming is started, as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-120924 filed Jun. 17, 2016, which is hereby incorporated by reference herein in its entirety.

What is claimed is:

1. A scanning device comprising:
a light source configured to emit a light beam;
a deflecting unit configured to deflect and scan the light beam emitted from the light source;
a driving unit configured to drive the deflecting unit to scan the light beam in a full-scanning region;
a generating unit disposed in a second region of the full-scanning region, wherein the second region is excluding a first region on which the light beam based on image data is scanned, and the generating unit is configured to generate a signal in response to reception of the light beam; and
a control unit configured to control a first light emission state and a second light emission state in an activation period from start of activation of the driving unit to when the number of rotations of the driving unit reaches a target number of rotations, the control unit controlling the light source to emit light such that the light beam scans the first region and the second region in the first light emission state and controlling the light source to emit light such that the light beam scans the second region,
wherein the control unit acquires cycles of the signals generated by the generating unit, determines a timing for changing from the first light emission state to the second light emission state on the basis of the cycles of two serial signals, and changes the light source from the first light emission state to the second light emission state according to the timing.

2. The scanning device according to claim 1, wherein the control unit determines the timing for changing from the first light emission state to the second light emission state in a first case in which a ratio between a first cycle of cycles of the two serial signals and a second cycle subsequent to the first cycle is equal to or higher than a predetermined value.

3. The scanning device according to claim 2, wherein the control unit determines the timing for changing from the first light emission state to the second light emission state in both the first case and a second case wherein the first cycle and the second cycle fall within a predetermined range.

4. The scanning device according to claim 2, wherein the control unit controls the light source to emit light in the first light emission state after a predetermined time period from start of rotation of the driving unit.

5. The scanning device according to claim 4, wherein the control unit sets the predetermined time period on the basis of a time period from deactivation of the driving unit to reception of an instruction to activate it.

6. The scanning device according to claim 5, wherein the predetermined time period to be set by the control unit is increased as the time period from deactivation of the driving unit to reception of the instruction to activate it.

7. The scanning device according to claim 6, wherein the control unit controls the driving unit to start rotating without the predetermined time period in a second case where the time period from deactivation of the driving unit to reception of the instruction to activate it is equal to or shorter than a first time period.

8. The scanning device according to claim 6, wherein the control unit fixes the predetermined time period to a third time period corresponding to a second time period in a second case where the time period from deactivation of the driving unit to start of activation thereof is equal to or longer than the second time period.

9. The scanning device according to claim 5, wherein the control unit sets the predetermined range on the basis of the time period from deactivation of the driving, unit to reception of the instruction to activate it and the predetermined time period.

10. The scanning device according to claim 2, wherein the control unit controls the light source to emit light after a fourth time period acquired on the basis of the first cycle from generation of the signal by the generating unit in the second light emission state.

11. The scanning device according to claim 10, wherein the control unit controls the light source to be in a light-off state when the generating unit generates a next signal in the second light emission state.

12. The scanning device according to claim 10, wherein the control unit controls the light source to be in a light-off state after a fifth time period acquired on the basis of the first cycle from light emission of the light source in the second light emission state.

13. The scanning device according to claim 1, wherein the control it sets a target light quantity of the light source in the first light emission state and the second light emission state to be a predetermined light quantity.

14. The scanning device according to claim 1, wherein the control unit sets a first target light quantity of the light source in the first light emission state to be lower than a second target light quantity of the light source in the second light emission state.

15. The scanning device according to claim 1, further comprising a light receiving element configured to receive the light beam emitted from the light source, wherein the control unit adjusts the light quantity of the light source on the basis of a light quantity of the light beam received by the light receiving element in the activation period.

16. The scanning device according to claim 1, wherein the control unit controls the number of rotations of the driving unit on the basis of the signal generated by the generating unit.

17. An image forming apparatus comprising:
a photosensitive member having an electrostatic latent image to be formed thereon;
a scanning device configured to form the electrostatic latent image on the photosensitive member, wherein the scanning device comprises:
 a light source configured to emit a light beam;
 a deflecting unit configured to deflect and scan the light beam emitted from the light source;
 a driving unit configured to drive the deflecting unit to scan the light beam in a full-scanning region;
 a generating unit disposed in a second region of the full-scanning region, wherein the second region is excluding a first region on which the light beam based on image data is scanned, and the generating unit is configured to generate a signal in response to reception of the light beam; and
 a control unit configured to control a first light emission state and a second light emission state in an activation period from start of activation of the driving unit to when the number of rotations of the driving unit reaches a target number of rotations, the control unit controlling the light source to emit light such that the light beam scans the first region and the second region in the first light emission state and controlling the light source to emit light such that the light beam scans the second region,
 wherein the control unit acquires cycles of the signals generated by the generating unit, determines a timing for changing from the first light emission state to the second light emission state on the basis of the cycles of two serial signals, and changes the light source from the first light emission state to the second light emission state according to the timing;
a developing unit configured to develop the electrostatic latent image formed on the photosensitive member by using toner to form a toner image; and
a transfer unit configured to transfer the toner image formed by the developing unit on the photosensitive member to a recording material.

\* \* \* \* \*